United States Patent
Miyazaki et al.

(10) Patent No.: US 7,365,036 B2
(45) Date of Patent: Apr. 29, 2008

(54) CRYSTALLIZED GLASS SPACER FOR FIELD EMISSION DISPLAY AND METHOD ITS PRODUCTION

(75) Inventors: Seiji Miyazaki, Yokohama (JP); Kei Maeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/746,986

(22) Filed: May 10, 2007

(65) Prior Publication Data
US 2007/0225144 A1    Sep. 27, 2007

Related U.S. Application Data

(63) Continuation of application No. PCT/JP2005/021150, filed on Nov. 17, 2005.

(30) Foreign Application Priority Data
Nov. 30, 2004   (JP) .................... 2004-346030

(51) Int. Cl.
*C03C 10/02* (2006.01)
*C03C 10/04* (2006.01)
(52) U.S. Cl. .................. 501/10; 501/5; 65/33.1
(58) Field of Classification Search ............ 501/5, 501/10; 65/33.1
See application file for complete search history.

(56) References Cited

U.S. PATENT DOCUMENTS

| | | | |
|---|---|---|---|
| 4,870,539 A | 9/1989 | Chance et al. | |
| 5,734,224 A | 3/1998 | Tagawa et al. | |
| 6,385,998 B1 | 5/2002 | Mizuno | |
| 6,586,867 B2 | 7/2003 | Morishita et al. | |
| 6,875,715 B2 * | 4/2005 | Nishikawa et al. | 501/72 |
| 7,015,160 B2 * | 3/2006 | Nishikawa et al. | 501/5 |
| 2002/0060513 A1 | 5/2002 | Morishita et al. | |
| 2004/0145297 A1 | 7/2004 | Nakashima et al. | |

FOREIGN PATENT DOCUMENTS

| | | | |
|---|---|---|---|
| JP | 2-233533 | | 9/1990 |
| JP | 7-230776 | | 8/1995 |
| JP | 2000-203857 | | 7/2000 |
| JP | 2002-104839 | | 4/2002 |
| JP | 2003-526187 | | 9/2003 |
| JP | 2004-43288 | | 2/2004 |
| JP | 2006124201 | * | 5/2006 |

* cited by examiner

*Primary Examiner*—Karl E Group
(74) *Attorney, Agent, or Firm*—Oblon, Spivak, McClelland, Maier & Neustadt, P.C.

(57) ABSTRACT

Provided is a crystallized glass spacer for a field emission display resistant to charging with application of an electric field and resistant to chipping or cracking thanks to high fracture toughness.

An $SiO_2$—$TiO_2$-based glass is subjected to a reduction and crystallization heat treatment at 600-900° C. in a hydrogen atmosphere or in a mixed atmosphere of hydrogen and nitrogen, to obtain a crystallized glass spacer for FED consisting essentially of, in molar percentage, $SiO_2$: 20-50%, $TiO_2$: 25-45%, MgO+CaO+SrO+BaO+ZnO: 20-50%, $B_2O_3$+$Al_2O_3$: 0-10% and $ZrO_2$: 0-10%, and containing as a principal crystal at least one crystal selected from $Ba_xTi_8O_{16}$-based crystals (X=0.8-1.5), $Ba_2TiSi_2O_8$-based crystals and $TiO_2$-based crystals.

13 Claims, 1 Drawing Sheet

US 7,365,036 B2

CRYSTALLIZED GLASS SPACER FOR FIELD EMISSION DISPLAY AND METHOD ITS PRODUCTION

BACKGROUND OF THE INVENTION

1. Field of the Invention

The present invention relates to a crystallized glass spacer with a high resistance to progress of destruction, i.e., a high fracture toughness and with an appropriate surface resistivity, a method for its production, and a field emission display (field emission-type display, which will be referred to hereinafter as "FED").

2. Discussion of Background

An FED is an image display apparatus in which a large number of microscopic electron guns (cold-cathode elements) are arranged for each of pixels, and in which electron beams are emitted from the electron guns toward phosphors to form an image, like a cathode ray tube (Cathode Ray Tube, which will be referred to hereinafter as "CRT").

Since the FED arranged to independently drive the electron guns in each of the pixels, requires no scanning with an electron beam over a wide angle range unlike the CRT, an image display panel thereof can be made thinner and flatter than the CRT (cf. Patent Document 1, for example). Particularly, the FED is expected to be used as a large-screen flat panel display with a diagonal size of at least about 1000 mm (about 40 inches), which is hardly realized by the CRT.

In the FED, an anode panel with phosphors faces an emitter panel with emitters for emitting electrons, through a plurality of spacers, and the periphery of the anode panel and emitter panel is sealed with a sealing material such as a glass paste (frit paste).

The internal space of the FED, i.e., the space between the anode panel and the emitter panel facing each other is typically in a high vacuum state of $10^{-3}$-$10^{-5}$ Pa, and electrons emitted from an emitter of the emitter panel into the space impinge upon a phosphor of the anode panel to induce electron beam-induced luminescence. As a result, a pixel develops a color to form an image.

The distance between the anode panel and the emitter panel facing each other is typically 1-2 mm, and in order to maintain the distance independently of the pressure difference between the atmospheric pressure and the pressure of the internal space (e.g., $10^{-3}$-$10^{-5}$ Pa), the spacers are interposed between the anode panel and the emitter panel, as described above.

Such spacers are required to have a precise dimensional accuracy, and in cases using glass spacers, there is thus a proposed production method of heating a preform with an appropriate accuracy at a temperature around the glass softening point and drawing it (cf. Patent Document 2, for example). This production method is also called a redraw-forming method, and has an advantage that a large amount of spacers can be continuously formed.

In addition, as the definition of the FED becomes finer, the space for installation of the spacers becomes narrower and thus thinner spacers are desired; therefore a glass material which can be produced by the redraw-forming method becomes more advantageous.

It is disclosed that a composition containing no alkali metal is suitable for glass spacers in order to prevent uneven distribution of mobile ions (cf. Patent Document 3). Furthermore, there are other disclosed spacers with an appropriate electronic conductivity made of a glass material containing a transition metal oxide of the element Fe or V in order to prevent charging due to electrons emitted from the emitters (cf. Patent Document 4).

Patent Document 1: JP-A-7-230776
Patent Document 2: JP-A-2000-203857
Patent Document 3: JP-A-2002-104839
Patent Document 4: JP-A-2003-526187

SUMMARY OF THE INVENTION

When the glass spacers described above were used, there was, however, a problem that the glass spacers cracked or chipped in part because of their low fracture toughness during handling the glass spacers and bonding the glass spacers to a panel in a panel assembling step of FED, thereby decreasing the yield. Furthermore, as the spacers become thinner for higher definition of FED as described above, it is highly likely that the probability of cracking or chipping will increase.

It is an object of the present invention to provide a crystallized glass spacer with a high fracture toughness to prevent chipping or cracking of the spacer while keeping an appropriate electronic conductivity like glass spacers, a method for its production, and an FED using the above-mentioned crystallized glass spacer.

The inventors of the present invention conducted extensive studies to solve the above-mentioned problems, and as a result, found that when an $SiO_2$—$TiO_2$-based glass was subjected to a heat treatment for reduction and crystallization (referred to hereinafter as "reduction and crystallization heat treatment") under appropriate conditions in a hydrogen atmosphere or in a mixed atmosphere of hydrogen gas and nitrogen gas, crystals containing Ti precipitate in the glass to increase a fracture toughness value while keeping a desired resistance suitable for a spacer for an FED because of a change in valency of some of Ti ions in the glass.

Based on the above-mentioned finding, the present invention provides a crystallized glass spacer for a field emission display, consisting essentially of, in molar percentage based on oxides below, $SiO_2$: 20-50%, $TiO_2$: 25-45%, MgO+CaO+SrO+BaO+ZnO: 20-50%, $B_2O_3$+$Al_2O_3$:0-10%, and $ZrO_2$: 0-10%; and containing as a principal crystal at least one crystal selected from $Ba_xTi_8O_6$-based crystals (X=0.8-1.5), $Ba_2TiSi_2O_8$-based crystals and $TiO_2$-based crystals. It is noted that a case of simply describing a spacer in the present invention means a crystallized glass spacer for a field emission display.

The above-mentioned spacer preferably has a fracture toughness value of at least 0.7 MPa·m$^{1/2}$. Furthermore, the spacer preferably has a surface resistivity of from $10^5$ to $10^{12}$ Ω at 20° C. Moreover, the above-mentioned spacer preferably has an average linear expansion coefficient of from $60\times10^{-7}$ to $110\times10^{-7}$/° C. in a temperature range of 50-350° C.

The present invention further provides as a production method for the above-mentioned spacer, a production method comprising a step of heat-treating a glass consisting essentially of, in molar percentage based on oxides below, $SiO_2$: 20-50%, $TiO_2$: 25-45%, MgO+CaO+SrO+BaO+ZnO: 20-50%, $B_2O_3$+$Al_2O_3$: 0-10% and $ZrO_2$: 0-10%, at 600-900° C. in a hydrogen atmosphere, in a mixed atmosphere of hydrogen and nitrogen, or in a mixed atmosphere of hydrogen and an inert gas, i.e., a step of subjecting the glass to a reduction and crystallization heat treatment.

Yet furthermore, the present invention provides a field emission display using the above-mentioned spacer.

When the $SiO_2$—$TiO_2$-based glass is subjected to the reduction and crystallization heat treatment in the production method of the present invention, the crystallized glass spacer suitable for use in the FED is efficiently obtained with a low surface resistivity and a high value of fracture toughness. The spacer is unlikely to be charged and thus unlikely to cause distortion of the screen image, and provides a high-quality FED. Furthermore, the above-mentioned spacer contributes to increase of the yield because a probability of occurrence of a chip or a crack decreases in the assembly step of FED panels and other steps.

EXPLANATION OF REFERENCE NUMERALS

Figure 1:
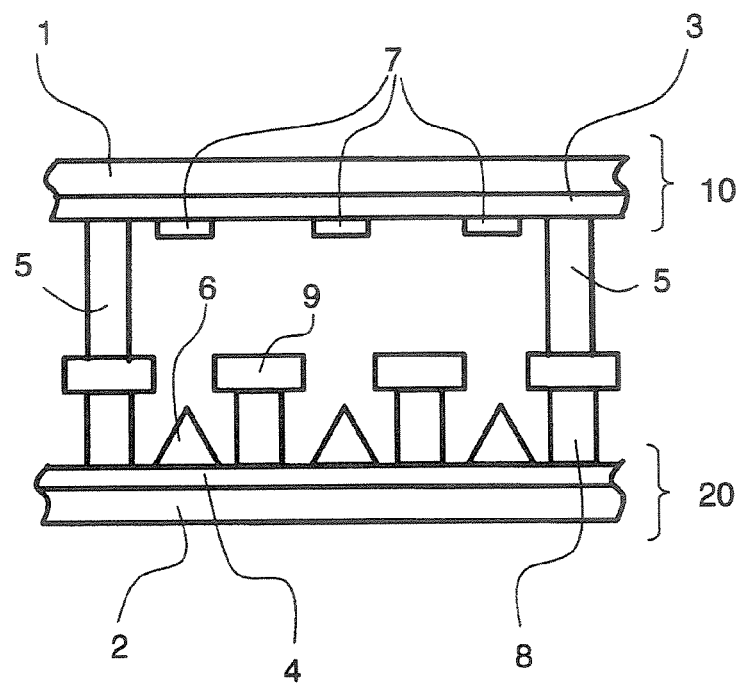
FIG. 1 is a schematic diagram schematically showing a partial cross section of an FED as an embodiment of the present invention.

1: front substrate
2: back substrate
3: anode electrode
4: cathode electrode
5: spacers
6: emitters
7: phosphors
8: insulating layer
9: gate electrodes
10: anode panel
20: emitter panel

DETAILED DESCRIPTION OF THE PREFERRED EMBODIMENT

<Glass Composition of Spacer>

Now, a composition of a raw glass for the spacer of the present invention (crystallized glass spacer for a field emission display) will be explained, and the composition of the crystallized glass spacer is substantially the same as the composition of the raw glass. Here, % representation means mol % unless otherwise noted.

$SiO_2$ is a component that forms a framework of the glass and that improves the stability and chemical durability of the glass, and is essential. $SiO_2$ is also a constituent component of a $Ba_2TiSi_2O_8$-based crystal. Its content is from 20 to 50%. If the content of $SiO_2$ is less than 20%, the stability or the chemical durability of the glass will degrade. The content is preferably at least 25%. If the content of $SiO_2$ exceeds 50%, a content of $TiO_2$ must decrease, whereby the surface resistivity of the glass will not decrease to the desired value even after completion of the reduction and crystallization heat treatment.

$TiO_2$ is a component that develops the electronic conductivity and decreases the surface resistivity through the reduction and crystallization heat treatment, and is essential. Furthermore, it is also a constituent component of a $Ba_xTi_8O_{16}$-based crystal (X=0.8-1.5), a $Ba_2TiSiO_8$-based crystal and a $TiO_2$-based crystal as a principal crystal, to promote crystal precipitation and to improve the value of fracture toughness. The content of $TiO_2$ is from 25 to 45%. If the content of $TiO_2$ is less than 25%, the surface resistivity will not decrease to the desired value even after completion of the reduction and crystallization heat treatment, and a desired crystal is less likely to precipitate. The content of $TiO_2$ is preferably at least 30%. If the content of $TiO_2$ exceeds 45%, the glass might be unstable and the chemical durability might degrade. Furthermore, if the glass is subjected to the redraw-forming, devitrification might occur. The Inventor believes that Ti is a main supply source of ions with their valency easy to vary and that the mixed ions with different valencies after the reduction and crystallization heat treatment reduce the surface resistivity.

MgO, CaO, SrO, BaO and ZnO are components that stabilize the glass and the glass preferably contains at least one component out of these components. In this case the total content of the five components MgO+CaO+SrO+BaO+ZnO is preferably at least 20%, and more preferably at least 25%. If the total content of the five components exceeds 50%, the glass might become unstable or devitrification might occur in the redraw-forming. The total content of the above five components is more preferably at most 45%. BaO selected from the above components is a constituent component of a $Ba_xTi_8O_{16}$-based crystal (X=0.8-1.5) and a $Ba_2TiSiO_8$-based crystal as one of principal crystals and the content of BaO is preferably at least 5%.

Neither $B_2O_3$ nor $Al_2O_3$ is essential, but the glass may contain them in a range of at most 10% in total in order to improve the stability or chemical durability of the glass. If the total content exceeds 10%, the glass will be unstable.

$ZrO_2$ is not essential, but the glass may contain it in a range of at most 10% in order to improve the stability or chemical durability of the glass. Furthermore, $ZrO_2$ is also effective as a nucleation agent in the reduction and crystallization heat treatment. If the content of $ZrO_2$ exceeds 10%, the glass will be unstable to the contrary or devitrification might occur in the stretch molding. Moreover, it also impedes precipitation of principal crystals. The content of $ZrO_2$ is preferably at most 5%.

Namely, the composition of the raw glass of the present invention is essentially, in molar percentage based on oxides below, $SiO_2$: 20-50%, $TiO_2$: 25-45%, MgO+CaO+SrO+BaO+ZnO: 20-50%, $B_2O_3$+$Al_2O_3$: 0-10% and $ZrO_2$: 0-10%. The above-mentioned glass composition is more preferably $SiO_2$: 25-50%, $TiO_2$: 30-45%, MgO+CaO+SrO+BaO+ZnO: 25-45%, $B_2O_3$+$Al_2O_3$: 0-10% and $ZrO_2$: 0-5%.

The spacer of the present invention comprises essentially the above-mentioned components, and may contain other components up to 10% in total. The total content of the other components is more preferably at most 5%. Examples of the other components include residues of a refining agent such as $SO_3$ and Cl; alkali metal oxides such as $Li_2O$, $Na_2O$ and $K_2O$; $Nb_2O_5$, $La_2O_3$, $Y_2O_3$ and $Fe_2O_3$.

In a case where the glass contains the above-mentioned $SO_3$ and Cl, the total content thereof is preferably at most 2%. $Li_2O$, $Na_2O$ and $K_2O$ are effective to promotion of melting of the glass, and the glass may contain at least one component selected from these components in the total content of at most 5%. If the total content of $Li_2O$, $Na_2O$ and/or $K_2O$ exceeds 5%, the ionic conductivity becomes stronger and the above-mentioned components will migrate with application of an electric field to cause polarization in the spacer, which might result in increase of the resistance.

The glass preferably contains no alkali metal oxide in a case where the ionic conductivity is desirably controlled. Furthermore, from the viewpoint of environmental consideration, the glass preferably contains none of Pb, V, As, Sb, Cd and Cr. If the glass contains any of these components in a content as small as an impurity without intentional mixing thereof, it can be regarded as a case where "the glass substantially contains none of them."

<Production Method of Spacer>

Now, the production method of the spacer of the present invention will be described.

First, raw materials are mixed so as to obtain an $SiO_2$—$TiO_2$-based glass composition containing the above-mentioned $SiO_2$ and $TiO_2$ as main components, in the usual method and melted in an electric furnace or the like to homogenize, and the molten glass is poured into a mold to produce a glass molded product.

Then, a processed product or redraw-formed product is produced in either of the following two methods. The first method is a method of subjecting the glass molded product to cutting and polishing to directly obtain a processed product in a predetermined size. The second method is a method of reheating a glass molded product, or a processed product obtained by processing the glass molded product, at a temperature around the softening point, redrawing it to obtain a continuous redraw-formed product, for example, in a shape of a ribbon and cutting it into a desired length.

The above-mentioned second method (redraw-forming) is preferable because the forming can be carried out with a high dimensional stability and at a low cost. In particular, it is a suitable method for producing a thin spacer. Furthermore, when a desired spacer is one with a complicated cross-sectional shape (trapezoid, cross, or the like), the above-mentioned redraw-forming method is more preferable.

Then, the processed product or the cut redraw-formed product obtained by either of the above-mentioned methods is subjected to the reduction and crystallization heat treatment. Specifically, the product is thermally treated at a desired temperature for a predetermined period of time in a hydrogen atmosphere, in a mixed atmosphere of hydrogen and nitrogen at a controlled mixing ratio, or in a mixed atmosphere of hydrogen and an inert gas at a controlled mixing ratio, whereby Ti ions are reduced mainly in a surface layer of the raw glass and Ti-containing crystals precipitate at the same time. The above-mentioned reduction and crystallization heat treatment reduces the surface resistivity and increases the value of fracture toughness to obtain the spacer of the present invention. Here, the mixing ratios of the above-mentioned gases can be controlled, for example, by changing a ratio of flow rates of the respective gases flowing in the electric furnace.

The temperature of the above-mentioned reduction and crystallization heat treatment is from 600 to 900° C. If the heat treatment is carried out at the temperature lower than 600° C., it will lead to less progression of reduction and less precipitation of crystals, with the result that the surface resistivity is substantially unchanged from that before the reduction and crystallization heat treatment and that the value of fracture toughness does not increase. If the temperature of the reduction and crystallization heat treatment is higher than 900° C., the glass processed product or the cut redraw-formed product might be deformed.

The temperature of the above-mentioned reduction and crystallization heat treatment is more preferably less than the softening point of the $SiO_2$—$TiO_2$-based glass. Furthermore, the above-mentioned method may be carried out by a one-step heat treatment in which the temperature is maintained at a constant temperature of 600-900° C., and the reduction and crystallization heat treatment is more preferably carried out in two steps of first reducing Ti ions and the like in the surface layer at a temperature around the glass transition point and then precipitating crystals at a temperature of at least the glass transition point and less than the softening point because the homogeneity level of the crystals is improved.

Moreover, the period for the above-mentioned reduction and crystallization heat treatment is preferably from 2 to 24 hours. If the period of the reduction and crystallization heat treatment is shorter than 2 hours, reduction of Ti ions and the like and crystallization will be insufficient, so as to fail to achieve desired values for the surface resistivity and fracture toughness from those before the reduction and crystallization heat treatment, which is not preferable. The period of the reduction and crystallization heat treatment can be longer than 24 hours but it is not preferable from the economical viewpoint because it does not substantially affect the surface resistivity and the fracture toughness.

The value of fracture toughness of the spacer obtained by the above-mentioned production method of the present invention is preferably at least 0.7 $MPa·m^{1/2}$, and more preferably at least 0.8 $MPa·m^{1/2}$. When the value of fracture toughness is at least 0.7 $MPa·m^{1/2}$, the spacer becomes less likely to chip or crack in the assembly step of FED panels and other steps.

A crystallized glass containing as a principal crystal at least one crystal selected from $Ba_XTi_8O_{16}$-based crystals (X=0.8-1.5), $Ba_2TiSi_2O_8$-based crystals and $TiO_2$-based crystals is obtained by the above-mentioned reduction and crystallization heat treatment in the production method of the present invention. The presence/absence of precipitation of crystals can be confirmed as follows by X-ray diffraction measurement with $CuK_\alpha$ radiation in a range of $2\theta$ being from 10 to 50°: a main diffraction peak is detected around 27-28° in $2\theta$ in the case of $Ba_XTi_8O_{16}$-based crystals (X=0.8-1.5); a main diffraction peak is detected around 29-30° in $2\theta$ in the case of $Ba_2TiSi_2O_8$-based crystals; and a main diffraction peak is detected around 24-25° in $2\theta$ in the case of $TiO_2$-based crystals. It is noted that in the case of the $Ba_2TiSi_2O_8$-based crystals, a solid solution resulting from partial replacement of Ba with Sr is also included.

The surface resistivity of the spacer obtained by the production method of the present invention is from $10^5$ to $10^{12}$ Ω at 20° C., and is thus suitable for the spacer for the FED. If the surface resistivity exceeds $10^{12}$ Ω, the spacer will be charged, which might deflect an electron beam. On the other hand, the lowest value of the surface resistivity depends on a shape of the spacer and a voltage applied between the spacers; if the surface resistivity is less than $10^5$, an excess current might flow on the surface of the spacer. The above-mentioned surface resistivity is more preferably from $10^7$ to $10^{11}$ Ω.

The average linear expansion coefficient α of the spacer of the present invention is preferably from $60×10^{-7}$ to $110×10^{-7}/°$ C. in the temperature range of 50-350° C. If the above average linear expansion coefficient α is less than $60×10^{-7}/°$ C. or more than $110×10^{-7}/°$ C., expansion matching might be difficult with an FED glass substrate having a typical average linear expansion coefficient a of from $75×10^{-7}$ to $90×10^{-7}/°$ C. Such a glass substrate may be, for example, soda lime silica glass.

<FED using Crystallized Glass Spacer>

The FED of the present invention is produced using the crystallized glass spacer of the present invention. The known systems for the FED include the diode system, the triode system, the tetrode system (a metal plate focusing electrode type, a thin film focusing electrode type, etc.), and so on. The system for the FED of the present invention is not restricted to a specific system, but may be any one of these systems.

The present invention will be described below with reference to FIG. 1. FIG. 1 is a schematic diagram of a partial cross section of the FED adopting the triode system. Generally, an anode panel 10 having phosphors 7 faces an emitter panel 20 having emitters 6 for emitting electrons, through a plurality of spacers 5 (two spacers in FIG. 1) in the FED. The anode panel 10 generally consists of a front substrate 1 being a transparent plate such as a glass plate; an anode electrode 3 being a transparent electrode formed on the surface opposed to the emitter panel 20, of the front substrate 1; the phosphors 7 formed on the anode electrode 3; and others.

The glass plate used for the front substrate 1 can be a soda lime silica glass plate or a high strain point glass used for a plasma display, having a thickness of 1-3 mm, for example. Furthermore, the transparent electrode used for the anode electrode 3 can be an ITO (Indium Tin Oxide: Sn-doped $In_2O_3$) film having a thickness of 0.01-100 μm, for example. The phosphors 7 are so formed that fluorescent materials of three colors of red (R), green (G), and blue (B) in each pixel are arranged in a stripe pattern through black stripes (not shown). Here, the three phosphors 7 shown in FIG. 1 are the fluorescent materials of R, G, and B in this order from the left.

The emitter panel 20 has the emitters 6 as an essential element and, in the triode system, it further has gate electrodes 9 and insulating layers 8 as essential elements in addition to the emitters 6. The gate electrodes 9 and the insulating layers 8 are unnecessary in the diode system. In the triode system, the emitter panel 20 generally consists of a back substrate 2 being a glass plate or the like; a cathode electrode 4 as an electrode formed on the surface opposed to the anode panel 10, of the back substrate 2; the emitters 6 and the insulating layers 8 formed on the cathode electrode 4; the gate electrodes 9 formed on the insulating layers 8; and others.

The glass plate to be used for the back substrate 2 may be a soda lime silica glass plate or a high strain point glass for a plasma display having a thickness of 1-3 mm, for example, as in the case of the front substrate 1.

The electrode to be used for the cathode electrode 4 may be, for example, a metal film of Al, Ag, or the like, or an ITO film having a thickness of 0.01-100 μm.

The emitters 6 are devices that emit electrons from their surface toward the phosphors 7, and may be, for example, diamondlike carbon (Diamond Like Carbon) emitters, carbon nanotube electron sources, field emitters made by anisotropic etching of Si, and field emitters evaporated with a metal such as Mo. There are no restrictions on the shape of the emitters 6, and FIG. 1 shows those of conical shape; typically, the height and diameter of the bottom face both are 0.1-100 μm and the number of emitters is from a few hundreds to a few thousands per pixel. Furthermore, the size of one pixel is approximately 300 μm×300 μm.

In the FED of the diode system, it is often the case that anode electrodes are formed in a stripe pattern, cathode electrodes are formed in a stripe pattern perpendicular to the anode electrodes, and the emitters are diamondlike carbon films formed on the cathode electrodes.

The gate electrodes 9 are formed as means for controlling the amount of electrons emitted from the emitters 6 and are, for example, films of a metal such as a Pt-based alloy having a thickness of 0.001-0.1 μm. The insulating layers 8 are provided in order to locate the gate electrodes 9 at desired positions relative to the emitters 6 and as means for electrically insulating the gate electrodes 9 from the cathode electrode 4, and are, for example, oxide ceramic films or PbO-$SiO_2$-RO-based low-melting glass films having a thickness of 0.1-100 μm. Here RO represents an alkaline-earth metal oxide.

The spacers 5 are provided in order to maintain the distance between the anode panel 10 and the emitter panel 20 at a desired value against the pressure difference between the atmospheric pressure and the pressure in the internal space of FED (e.g., $10^{-3}$-$10^{-5}$ Pa), and, typically, they have the height of 1-2 mm and the width of 0.01-0.5 mm.

The FED of the present invention uses the spacers produced by the production method of the present invention. The FED of the present invention using the crystallized glass spacers may be produced in the same manner as in the production method of the conventional FED using alumina spacers.

Now, the present invention will be explained in detail based on examples.

EXAMPLES

Example 1

Example of the Present Invention

Raw materials were mixed in a composition of $SiO_2$: 31 mol %, $TiO_2$: 37 mol %, $Al_2O_3$: 3 mol %, CaO: 14 mol % and BaO: 15 mol %, and melted in a platinum or platinum-rhodium crucible under stirring and at 1400° C. in an air in an electric furnace for five hours. Then the molten glass was poured out to be formed into a plate, and slowly cooled.

The plate obtained by the above method was polished and cut in a size of 2×0.2×50 mm and in a shape of the spacer for the FED. Furthermore, a part of a small piece was cut into a predetermined size and polished to obtain test pieces. These processed products were introduced into a quartz tubular furnace and maintained at 740° C. for two hours under flow of hydrogen at a flow rate of 0.2 liter/min and nitrogen at a flow rate of 1.8 liters/min, and then the temperature was raised at a rate of 50° C./hr up to 790° C. and maintained for 14 hours, whereby the reduction and crystallization heat treatment was carried out for 17 hours in total.

Figure 2:
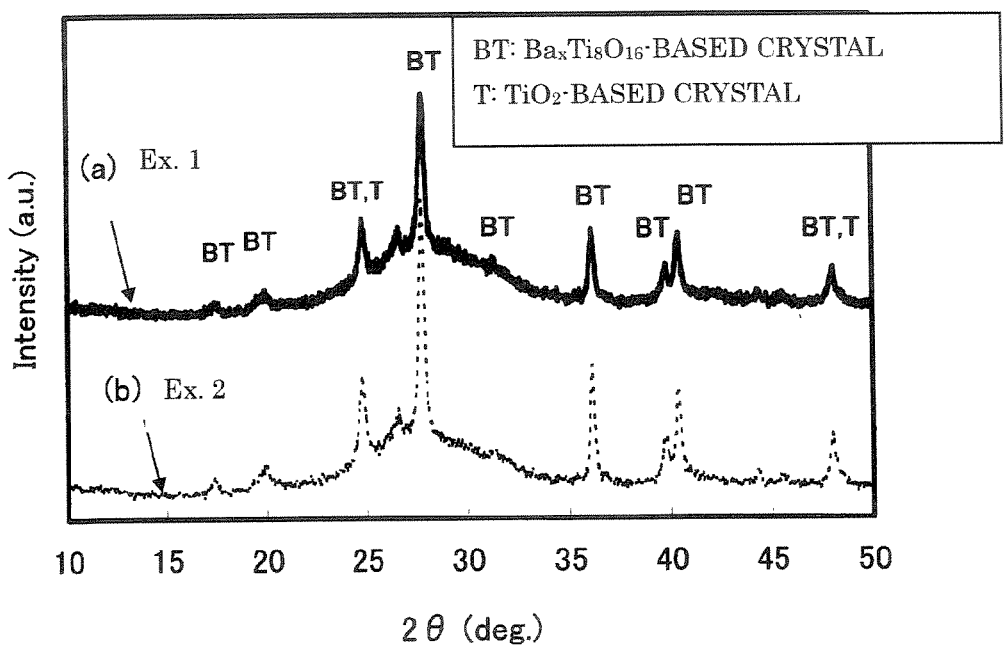
FIG. 2 shows graphs of X-ray diffraction analyses of Example 1 and Example 2.

The spacer and test pieces thus obtained were subjected to X-ray diffraction with $CuK_\alpha$ radiation in a range of 2θ being 10-50° and diffraction peaks of $Ba_XTi_8O16$-based crystals (X=0.8-1.5) and $TiO_2$-based crystals were detected as in graph (a) of FIG. 2, which confirmed the crystallized glass. Next, the value of fracture toughness $K_{IC}$ was measured by the IF (Indentation Fracture) method in accordance with JIS R1607 and it was as high as 0.86 MPa·$m^{1/2}$. The IF method is a method wherein a value of fracture toughness $K_{IC}$ is determined by a size of an indentation remaining on a surface of a crystallized glass or a glass when a Vickers indenter is pushed into the glass, lengths of cracks generated from four of the corners of the indentation, and a Young's modulus. The Young's modulus was measured by the ultrasonic method. Moreover, the surface resistivity at 20° C. was measured by a high resistance meter (R8340A manufactured by ADVANTEST CORPORATION) and the surface resistivity was $10^{8.4}$ Ω which was a value suitable for the spacer for the FED.

The average linear expansion coefficient a in a temperature range of 50-350° C. was 84×$10^{-7}$/° C., which was close to those of a commercially available soda lime glass (α: 87×$10^{-7}$/° C.) and a commercially available glass for the plasma display being a high strain point glass (manufactured by Asahi Glass Co. Ltd/trade name: PD200/average linear expansion coefficient α: $83 \times 10^{-7}$/° C.)

Example 2

Example of the Present Invention

Raw materials were mixed in a composition of $SiO_2$: 31 mol %, $TiO_2$: 37 mol %, $Al_2O_3$: 3 mol %, CaO: 14 mol %, and BaO: 15 mol %, and melted in a platinum or platinum-rhodium crucible under stirring and at 1400° C. in an air in an electric furnace for five hours. Then the molten glass was poured out to be formed into a plate, and slowly cooled.

The plate obtained by the above method was polished and cut in a size of 2×0.2×50 mm and in a shape of the spacer for the FED. Furthermore, a part of a small piece was cut into a predetermined size and polished to obtain test pieces. These processed products were introduced into a quartz tubular furnace and maintained at 740° C. for two hours under flow of hydrogen at a flow rate of 1.4 liters/min and nitrogen at a flow rate of 0.6 liter/min, and then the temperature was raised at a rate of 50° C./hr up to 810° C. and maintained for 6 hours, whereby the reduction and crystallization heat treatment was carried out for 9 hours and 24 minutes in total.

The spacer and test pieces thus obtained were subjected to X-ray diffraction with $CuK_\alpha$ radiation in a range of 2θ being 10 to 50° and diffraction peaks of $Ba_XTi_8O_{16}$-based crystals (X=0.8-1.5) and $TiO_2$-based crystals were detected as in graph (b) of FIG. 2, which confirmed the crystallized glass. Next, the value of fracture toughness $K_{IC}$ was measured and it was as high as 1.33 MPa·m$^{1/2}$. Furthermore, the surface resistivity at 20° C. was $10^{6.5}$ Ω which was a value suitable for the spacer for the FED.

The average linear expansion coefficient α in a temperature range of 50-350° C. was $84 \times 10^{-7}$/° C., which was close to those of a commercially available soda lime glass and a commercially available glass for the plasma display being a high strain point glass.

Example 3

Comparative Example

Raw materials were mixed in a composition of $SiO_2$: 31 mol %, $TiO_2$: 37 mol %, $Al_2O_3$: 3 mol %, CaO: 14 mol %, and BaO: 15 mol %, and melted in a platinum or platinum-rhodium crucible under stirring and at 1400° C. in an air in an electric furnace for five hours. Then the molten glass was poured out to be formed into a plate, and slowly cooled.

The plate obtained by the above method was polished and cut in a size of 2×0.2×50 mm and in a shape of the spacer for the FED. Furthermore, a part of a small piece was cut into a predetermined size and polished to obtain test pieces. However, no heat treatment was carried out for these processed products.

The value of fracture toughness $K_{IC}$ of the glass was measured and was as low as 0.62 MPa·m$^{1/2}$, and a rate of occurrence of a chip or a crack was expected to be high when the glass was used for the spacer for the FED. Furthermore, the surface resistivity at 20° C. was $10^{16.2}$ Ω and no spacer obtained had a desired resistivity.

With the test pieces in Example 1 (Example of the present invention) to Example 3 (Comparative Example), the glass transition point $T_g$ is 744° C. and the softening point $T_s$ is 813° C.

Table 1 below shows crystal types identified by the X-ray diffraction (in the table, ET represents $Ba_XTi_8O_{16}$-based crystals, BTS $Ba_2TiSi_2O_8$-based crystals, T $TiO_2$-based crystals and O crystals other than the above crystals), values of fracture toughness $K_{IC}$ (unit: MPa·m$^{1/2}$), surface resistivities at 20° C. (unit: Ω) and average linear expansion coefficients α from 50° C. to 350° C. (unit: $10^{-7}$/° C.) for the test pieces obtained in Example 1 to Example 3.

TABLE 1

|  |  | Example 1 Example of the present invention | Example 2 Example of the present invention | Example 3 Comparative Example |
|---|---|---|---|---|
| Glass composition (mol %) | $SiO_2$ | 31 | 31 | 31 |
|  | $TiO_2$ | 37 | 37 | 37 |
|  | $Al_2O_3$ | 3 | 3 | 3 |
|  | CaO | 14 | 14 | 14 |
|  | BaO | 15 | 15 | 15 |
| Glass transition point Tg (° C.) |  | 744 | 744 | 744 |
| Glass softening point Ts (° C.) |  | 813 | 813 | 813 |
| Hydrogen flow rate (liter/min) |  | 0.2 | 1.4 | — |
| Nitrogen flow rate (liter/min) |  | 1.8 | 0.6 | — |
| Temperature in the first step of reduction and crystallization heat treatment (° C.) |  | 740 | 740 | — |
| Period of the first step of reduction and crystallization heat treatment (hr) |  | 2 | 2 | — |
| Temperature in the second step of reduction and crystallization heat treatment (° C.) |  | 790 | 810 | — |
| Period of the second step of reduction and crystallization heat treatment (hr) |  | 14 | 6 | — |
| Total periods of the reduction and crystallization heat treatment (hr) |  | 17 | 9.4 | — |
| Type of crystals precipitated |  | BT, T | PTC BT, T | — |
| Value of fracture toughness $K_{IC}$ (MPa · m$^{1/2}$) |  | 0.86 | 1.33 | 0.62 |
| Surface resistivity (Ω) |  | $10^{8.4}$ | $10^{6.5}$ | $10^{16.2}$ |
| Average linear expansion coefficient α ($10^{-7}$/° C.) |  | 84 | 84 | 84 |

With the test pieces of the above Example 1 and Example 2 (both of which are Examples of the present invention), the surface resistivities are $10^5$-$10^{12}$ Ω and the values of fracture toughness are at least 0.70 MPa·m$^{1/2}$, which are suitable for the spacers for the FED. However, with the test piece of Example 3 (Comparative Example) which is not subjected to the reduction and crystallization heat treatment, the surface resistivity is larger than $10^{12}$ Ω and thus the glass might be charged to deflect an electron beam. Furthermore, the test piece of Example 3 has the value of fracture toughness of less than 0.7 MPa·ml/$^{1/2}$ and is thus likely to chip or crack.

Example 4 to Example 9 Examples of the Present invention and Example 10 to Example 13 Comparative Examples First, raw materials of oxides, carbonates, sulfates and nitrates generally used as raw materials for glass are blended in contents (in molar %) as shown in Table 2 to Table 4 below, and melted in a platinum or platinum-rhodium crucible under stirring and at 1400° C. in an atmospheric air in an electric furnace for five hours. Next, the molten glass is poured out from the crucible to be formed into a plate, and slowly cooled to produce a plurality of plates for Examples of the present invention of Example 4 to Example 9 and a plurality of plates for Comparative Examples of Example 10 to Example 13.

Then the plate materials for Example 4 to Example 13 obtained by the above-mentioned method were cut into a desired size and polished to obtain test pieces. A test piece among a plurality of test pieces produced in each Example was subjected to measurement of the glass transition point $T_g$ (unit: ° C.) and the glass softening point $T_s$ (unit: ° C.) and Table 2 to Table 4 show measured values thereof.

Furthermore, each of the rest test pieces of Example 4 to Example 13 was introduced into a quartz tubular furnace and was subjected to the two-step reduction and crystallization heat treatment at temperatures and for periods as shown in Table 2 and Table 3 under flow of hydrogen and nitrogen gases at flow rates as shown in Table 2 and Table 3. A temperature-raising rate from the first step to the second step was 50° C./hr. It is noted that Example 12 in Table 4 corresponds to a composition exemplified as a glass spacer in Patent Document 3 and Example 13 corresponds to a composition exemplified as a glass spacer in Patent Document 4. The above-mentioned reduction and crystallization heat treatment was not carried out for Example 12 and Example 13.

Table 2 to Table 4 below show crystal types identified by the X-ray diffraction (in the Tables, BT represents $Ba_xTi_8O_{16}$-based crystals, BTS $Ba_2TiSi_2O_8$-based crystals, T $TiO_2$-based crystals and O crystals other than the above crystals), values of fracture toughness $K_{IC}$ (unit: MPa·m$^{1/2}$), surface resistivities at 20° C. (unit: Ω) and average linear expansion coefficients α from 50° C. to 350° C. (unit: $10^{-7}$/° C.) for the test pieces obtained in Example 4 to Example 13.

TABLE 2

| | | Ex. 4 Example of the present invention | Ex. 5 Example of the present invention | Ex. 6 Example of the present invention | Ex. 7 Example of the present invention |
|---|---|---|---|---|---|
| Glass composition (mol %) | SiO$_2$ | 30 | 33.5 | 35 | 34 |
| | TiO$_2$ | 40 | 36.5 | 35 | 37 |
| | Al$_2$O$_3$ | 0 | 1 | 0 | 0 |
| | CaO | 7.5 | 11.5 | 7.5 | 11.5 |
| | SrO | 7.5 | 7.5 | 7.5 | 0 |
| | BaO | 15 | 10 | 15 | 17.5 |
| Glass transition point Tg (° C.) | | 740 | 737 | 744 | 739 |
| Glass softening point Ts (° C.) | | 806 | 812 | 815 | 812 |
| Hydrogen flow rate (liter/min) | | 0.02 | 1.4 | 0.2 | 1.4 |
| Nitrogen flow rate (liter/min) | | 1.98 | 0.6 | 1.8 | 0.6 |
| Temperature in the first step of reduction and crystallization heat treatment (° C.) | | 740 | 740 | 740 | 740 |
| Period of the first step of reduction and crystallization heat treatment (hr) | | 2 | 2 | 2 | 2 |
| Temperature in the second step of reduction and crystallization heat treatment (° C.) | | 790 | 810 | 810 | 790 |
| Period of the second step of reduction and crystallization heat treatment (hr) | | 14 | 6 | 14 | 14 |
| Type of crystals precipitated | | BTS, O | BT | BT, O | BT, T |
| Value of fracture toughness K$_{IC}$ (MPa · m$^{1/2}$) | | 0.74 | 1.27 | 0.85 | 0.85 |
| Surface resistivity (Ω) | | 10$^{10.7}$ | 10$^{7.5}$ | 10$^{7.1}$ | 10$^{7.6}$ |
| Average linear expansion coefficient α (10$^{-7}$/° C.) | | 89 | 85 | 87 | 85 |

TABLE 3

| | | Ex. 8 Example of the present invention | Ex. 9 Example of the present invention | Ex. 10 Comp. Ex. | Ex. 11 Comp. Ex. |
|---|---|---|---|---|---|
| Glass composition (mol %) | SiO$_2$ | 40 | 33 | 50 | 30 |
| | TiO$_2$ | 30 | 37 | 20 | 47.5 |
| | Al$_2$O$_3$ | 0 | 1 | 0 | 0 |
| | CaO | 7.5 | 9 | 0 | 5 |
| | SrO | 7.5 | 0 | 0 | 6 |
| | BaO | 15 | 20 | 30 | 11.5 |
| Glass transition point Tg (° C.) | | 744 | 737 | 743 | — |
| Glass softening point Ts (° C.) | | 823 | 811 | 820 | — |
| Hydrogen flow rate (liter/min) | | 1.4 | 1.4 | 1.4 | — |
| Nitrogen flow rate (liter/min) | | 0.6 | 0.6 | 0.6 | — |
| Temperature in the first step of reduction and crystallization heat treatment (° C.) | | 740 | 740 | 740 | — |
| Period of the first step of reduction and crystallization heat treatment (hr) | | 2 | 2 | 2 | — |
| Temperature in the second step of reduction and crystallization heat treatment (° C.) | | 820 | 810 | 820 | — |
| Period of the second step of reduction and crystallization heat treatment (hr) | | 6 | 2 | 2 | — |
| Type of crystals precipitated | | BTS, T | T | O | — |
| Value of fracture toughness K$_{IC}$ (MPa · m$^{1/2}$) | | 1.06 | 0.97 | 1.20 | — |
| Surface resistivity (Ω) | | 10$^{6.4}$ | 10$^{7.0}$ | 10$^{14.2}$ | — |
| Average linear expansion coefficient α (10$^{-7}$/° C.) | | 84 | 87 | 86 | — |

TABLE 4

| | | Example 12 Comparative Example | Example 13 Comparative Example |
|---|---|---|---|
| Glass composition (mol %) | SiO$_2$ | 40.1 | 63.3 |
| | B$_2$O$_3$ | 12.6 | 0 |
| | Al$_2$O$_3$ | 5 | 0.2 |
| | Na$_2$O | 0 | 2.7 |
| | CaO | 32.5 | 0 |
| | SrO | 0 | 6.1 |
| | BaO | 7.6 | 14.8 |
| | ZnO | 0.9 | 0 |
| | La$_2$O$_3$ | 1.3 | 0 |
| | Fe$_2$O$_3$ | 0 | 11.5 |
| | V$_2$O$_5$ | 0 | 1.5 |
| Glass transition point Tg (° C.) | | 667 | 586 |
| Value of fracture toughness K$_{IC}$ (MPa · m$^{1/2}$) | | 0.58 | 0.66 |
| Surface resistivity (Ω) | | >10$^{16.2}$ | 10$^{12.6}$ |
| Average linear expansion coefficient α (10$^{-7}$/° C.) | | 83 | 77 |

As described above, the test pieces in Example 4 to Example 9 (Examples of the present invention) have appropriate compositions and are subjected to the reduction and crystallization heat treatment, so as to obtain the crystallized glasses with the high values of fracture toughness, and thus have the surface resistivities and the values of fracture toughness suitable for the spacer for the FED.

However, in Example 10 (Comparative Example) the content of $TiO_2$ is less than 25%, so that any suitable surface resistivity cannot be obtained after the reduction and crystallization heat treatment. Furthermore, in Example 11 (Comparative Example), the content of $TiO_2$ exceeds 45%, and devitrification occurs during the pouring-out of the molten glass, so as to fail to obtain a transparent homogenous raw glass. Moreover, in Example 12 and Example 13 (both Comparative Examples), the resultant glasses are not the crystallized glasses, so as to fail to achieve a high value of fracture toughness.

The glass spacer as detailed above is useful because it suppresses occurrence of a crack or a chip and increases the yield in production of the field emission display.

The present invention efficiently provides the crystallized glass spacer with the low surface resistivity and the high value of fracture toughness through the reduction and crystallization heat treatment of the $SiO_2$—$TiO_2$-based glass, and thus the spacer is applicable to the high-quality FED resistant to distortion of the image due to charging.

The entire disclosure of Japanese Patent Application No. 2004-346030 filed on Nov. 30, 2004 including the specification, claims, drawings and summary is incorporated herein by reference in its entirety.

What is claimed is:

1. A crystallized glass spacer for a field emission display consisting essentially of, in molar percentage based on oxides below, $SiO_2$: 20-50%,
$TiO_2$: 25-45%,
MgO+CaO+SrO+BaO+ZnO: 20-50%,
$B_2O_3$+$Al_2O_3$: 0-10%, and
$ZrO_2$: 0-10%;

and comprising as a principal crystal at least one crystal selected from the group consisting of $Ba_xTi_8O_{16}$-based crystals (X=0.8-1.5), $Ba_2TiSi_2O_8$-based crystals and $TiO_2$-based crystals.

2. The crystallized glass spacer for a field emission display according to claim 1, wherein a fracture toughness value is at least 0.7 MPa·m$^{1/2}$.

3. The crystallized glass spacer for a field emission display according to claim 1, wherein a surface resistivity is from $10^5$ to $10^{12}$ Ω at 20° C.

4. The crystallized glass spacer for the field emission display according to claim 1, wherein an average linear expansion coefficient is from $60 \times 10^{-7}$ to $110 \times 10^{-7}$/° C. in a temperature range of 50-350° C.

5. A method for producing a crystallized glass spacer for a field emission display as set forth in claim 1, comprising heat-treating a glass consisting essentially of, in molar percentage based on oxides below, $SiO_2$: 20-50%,
$TiO_2$: 25-45%,
MgO+CaO+SrO+BaO+ZnO: 20-50%,
$B_2O_3$+$Al_2O_3$: 0-10%, and
$ZrO_2$: 0-10%, at 600-900° C. in a reducing atmosphere.

6. The method for producing a crystallized glass spacer for a field emission display according to claim 5, wherein the reducing atmosphere is a hydrogen atmosphere.

7. The method for producing a crystallized glass spacer for a field emission display according to claim 5, wherein the reducing atmosphere is a mixed atmosphere of hydrogen and nitrogen.

8. The method for producing a crystallized glass spacer for a field emission display according to claim 5, wherein a period for the heat treating is from 2 to 24 hours.

9. A field emission display comprising an anode panel having a phosphor, an emitter panel having an emitter for emitting an electron, and a plurality of spacers, the anode panel and the emitter panel facing each other as separated by the spacers, wherein the spacers are the crystallized glass spacers for a field emission display as defined in claim 1.

10. The crystallized glass spacer for the field emission display according to claim 2, wherein an average linear expansion coefficient is from $60 \times 10^{-7}$ to $110 \times 10^{-7}$/° C. in a temperature range of 50-350° C.

11. The crystallized glass spacer for the field emission display according to claim 3, wherein an average linear expansion coefficient is from $60 \times 10^{-7}$ to $110 \times 10^{-7}$/° C. in a temperature range of 50-350° C.

12. The crystallized glass spacer for a field emission display according to claim 3, wherein the surface resistivity is from $10^7$ to $10^{11}$ Ω at 20° C.

13. The crystallized glass spacer for a field emission display according to claim 2, wherein the fracture toughness value is at least 0.8 MPa·m$^{1/2}$.

* * * * *